(12) United States Patent
Gomez et al.

(10) Patent No.: US 8,519,909 B2
(45) Date of Patent: *Aug. 27, 2013

(54) MULTIMODE INPUT FIELD FOR A HEAD-MOUNTED DISPLAY

(76) Inventors: Luis Ricardo Prada Gomez, Hayward, CA (US); Aaron Wheeler, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,957

(22) Filed: Jun. 21, 2012

(65) Prior Publication Data

US 2012/0317484 A1    Dec. 13, 2012

Related U.S. Application Data

(63) Continuation of application No. 13/157,038, filed on Jun. 9, 2011, now Pat. No. 8,223,088.

(51) Int. Cl.
*G09G 5/00* (2006.01)

(52) U.S. Cl.
USPC .......................................................... 345/7

(58) Field of Classification Search
USPC ........................................ 345/5–9; 715/716
See application file for complete search history.

(56) References Cited

U.S. PATENT DOCUMENTS

| | | | |
|---|---|---|---|
| 4,975,960 A | 12/1990 | Petajan | |
| 6,349,001 B1 | 2/2002 | Spitzer | |
| 6,396,497 B1 | 5/2002 | Reichlen | |
| 7,030,909 B2 | 4/2006 | Grosvenor et al. | |
| 7,308,158 B2 * | 12/2007 | Herbert et al. | 382/298 |
| 2006/0218193 A1 | 9/2006 | Gopalakrishnan | |
| 2007/0294122 A1 | 12/2007 | Johnston | |
| 2008/0086311 A1 | 4/2008 | Conwell et al. | |
| 2008/0242343 A1 | 10/2008 | Koh et al. | |
| 2009/0171659 A1 * | 7/2009 | Pearce et al. | 704/235 |
| 2010/0091027 A1 | 4/2010 | Oyama et al. | |
| 2010/0149073 A1 * | 6/2010 | Chaum et al. | 345/8 |
| 2010/0211605 A1 | 8/2010 | Ray | |
| 2011/0034176 A1 * | 2/2011 | Lord et al. | 455/450 |

OTHER PUBLICATIONS

Keyson, et al., Designing for Pen and Speech Input in an Object-Action Framework: The Case of Email, University Access Inf Soc, pp. 134-142, 2003.

Kondratova et al., Multimodal Field Data Entry: Performance and Usability Issues, Proceedings of the Joint International Conference on Computing and Decision Making in Civil and Building Engineering, 2006, http://nparc.cisti-icist.nrc-cnrc.gc.ca/npsi/ctrl?action=rtdoc&an=5765763, retrieved on Apr. 8, 2011.

Chen et al., Streaming Mobile Augmented Reality on Mobile Phones, Proceedings of the 2009 8th IEEE International Symposium on Mixed and Augmented Reality, pp. 19-20, Oct. 2009, http:http://www.stanford.edu/~bgirod/pdfs/Chen_ISMAR2009.pdf, retrieved on Apr. 8, 2011.

* cited by examiner

*Primary Examiner* — William Boddie
*Assistant Examiner* — Carolyn R Edwards
(74) *Attorney, Agent, or Firm* — McDonnell Boehnen Hulbert & Berghoff LLP

(57) ABSTRACT

Exemplary methods and systems relate to a multimode input field for a head-mountable display (HMD). An exemplary multimode input field is operable to display content based on a number of modalities of input data, which may be received from a number of different input sources. Further, the input sources and/or content for the multimode input field may be selected based on implicit information in input data from the input sources, explicit instructions, and/or context information.

20 Claims, 9 Drawing Sheets

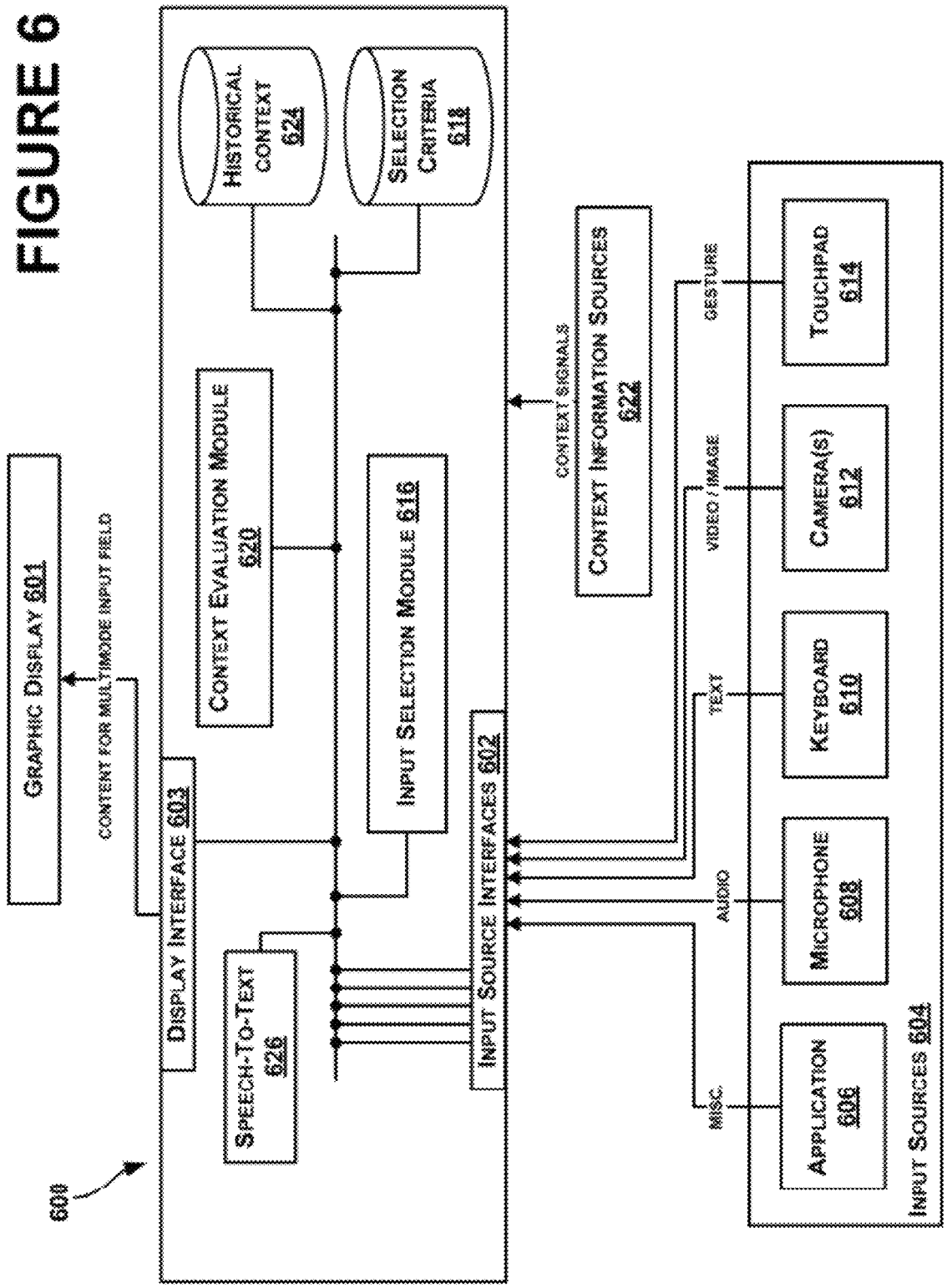

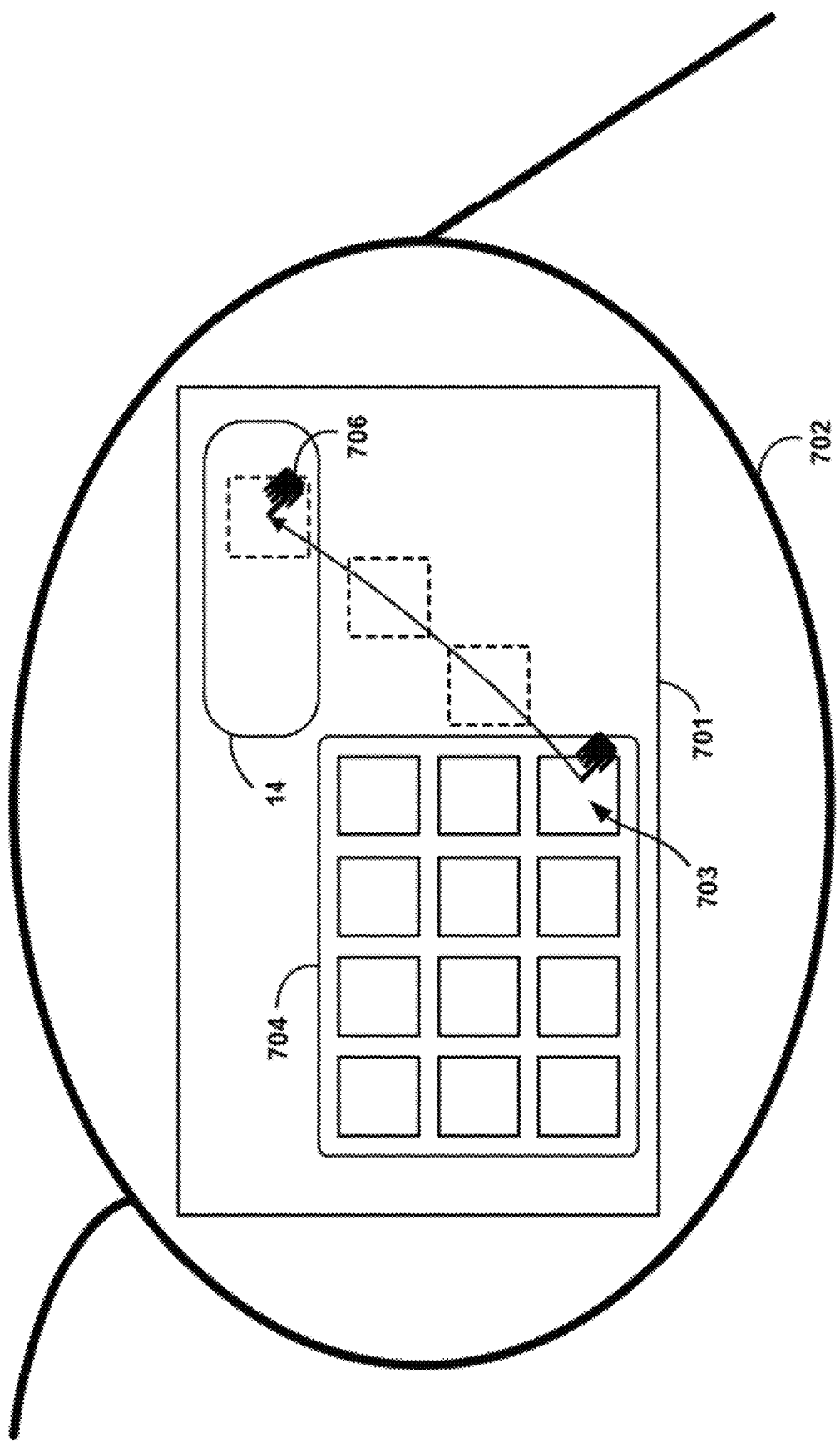

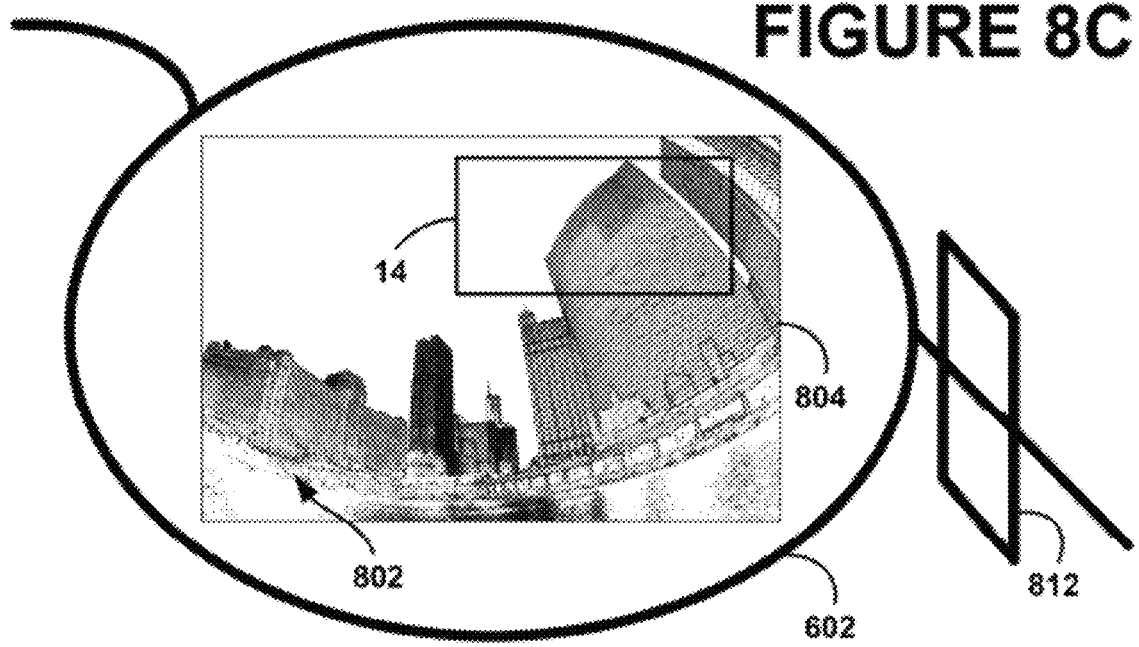
FIGURE 8C
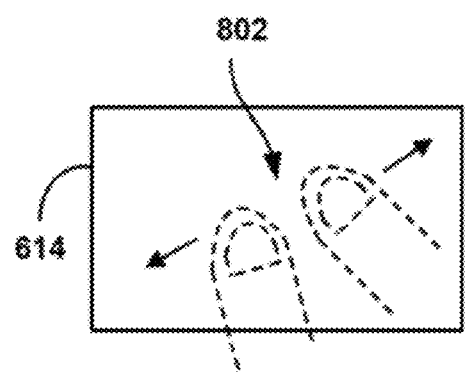

MULTIMODE INPUT FIELD FOR A HEAD-MOUNTED DISPLAY

RELATED APPLICATION

This application claims priority to U.S. patent application Ser. No. 13/157,038 filed Jun. 9, 2011, entitled "Multimode Input Field for a Head-Mounted Display", the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted" or "head-mountable" displays (HMDs). A head-mountable display places a graphic display or displays close to one or both eyes of a wearer. To generate the images on a display, a computer processing system may be used. Such displays may occupy a wearer's entire field of view, or only occupy part of a wearer's field of view. Further, head-mountable displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary system includes a non-transitory computer-readable medium and program instructions stored on the non-transitory computer-readable medium and executable by a processor to: (i) provide a multimode input field in a graphical display of a head-mountable display (HMD), wherein the multimode input field is operable to display content based on a plurality of modalities of input data received from any of a plurality of input sources, wherein the plurality of modalities comprises at least two of audio, image, text, and video; (ii) receive input data from the plurality of input sources; (iii) monitor the received input data for one or more data patterns indicated by input-selection criteria, wherein the one or more data patterns comprise: (a) at least one data pattern that corresponds to implicit information that is indicative of desired content for the multimode input field and (b) at least one data pattern corresponding to an explicit input-content instruction that indicates desired content for the multimode input field; (iv) select at least one input source from the plurality of input sources in response to detection of a data pattern in the received input data, wherein the detected data pattern matches a corresponding one of the data patterns indicated by the input-selection criteria; and (v) display content in the multimode input field, wherein the displayed content is based on input data received from the at least one selected input source.

In another aspect, a non-transitory computer-readable medium may have program instructions stored thereon that are executable by at least one processor. The program instructions may include: (i) instructions for causing a graphical display of a head-mountable display (HMD) to display a multimode input field, wherein the multimode input field is a single graphical interface element that is controllable to display content based on a plurality of modalities of input data received from any of a plurality of input sources, and wherein the plurality of modalities comprises point-of-view video and at least one of audio, image, text, and video; (ii) instructions for receiving input data from the plurality of input sources; (iii) instructions for monitoring the received input data for one or more data patterns indicated by input-selection criteria, wherein the one or more data patterns comprise: (a) at least one data pattern that corresponds to implicit information that is indicative of desired content for the multimode input field and (b) at least one data pattern corresponding to an explicit input-content instruction that indicates desired content for the multimode input field; (iv) instructions for selecting at least one input source from the plurality of input sources in response to detection of a data pattern in the received input data, wherein the detected data pattern matches a corresponding one of the data patterns indicated by the input-selection criteria; and (v) instructions for displaying content in the multimode input field, wherein the displayed content is based on input data received from the at least one selected input source.

In yet another aspect, an exemplary computer-implemented method involves: (i) causing a graphical display of a head-mountable display (HMD) to display a multimode input field, wherein the multimode input field is a single graphical interface element that is controllable to display content based on a plurality of modalities of input data received from any of a plurality of input sources, and wherein the plurality of modalities comprises point-of-view video and at least one of audio, image, text, and video; (ii) receiving input data from the plurality of input sources; (iii) monitoring the received input data for one or more data patterns indicated by input-selection criteria, wherein the one or more data patterns comprise: (a) at least one data pattern that corresponds to implicit information that is indicative of desired content for the multimode input field and (b) at least one data pattern corresponding to an explicit input-content instruction that indicates desired content for the multimode input field; (iv) selecting at least one input source from the plurality of input sources in response to detection of a data pattern in the received input data, wherein the detected data pattern matches a corresponding one of the data patterns indicated by the input-selection criteria; and (v) displaying content in the multimode input field, wherein the displayed content is based on input data received from the at least one selected input source.

These as well as other aspects, advantages, and alternatives, will become apparent to those of ordinary skill in the art

BRIEF DESCRIPTION OF THE DRAWINGS

FIG. 6 is a functional block diagram illustrating a wearable computing system according to an exemplary embodiment.

FIG. 7 is a simplified illustration of an HMD during an exemplary drag and drop action.

FIGS. 8C and 8D are additional illustrations of an HMD displaying a multimode input field that encloses a portion of a displayed image.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

Figure 1:
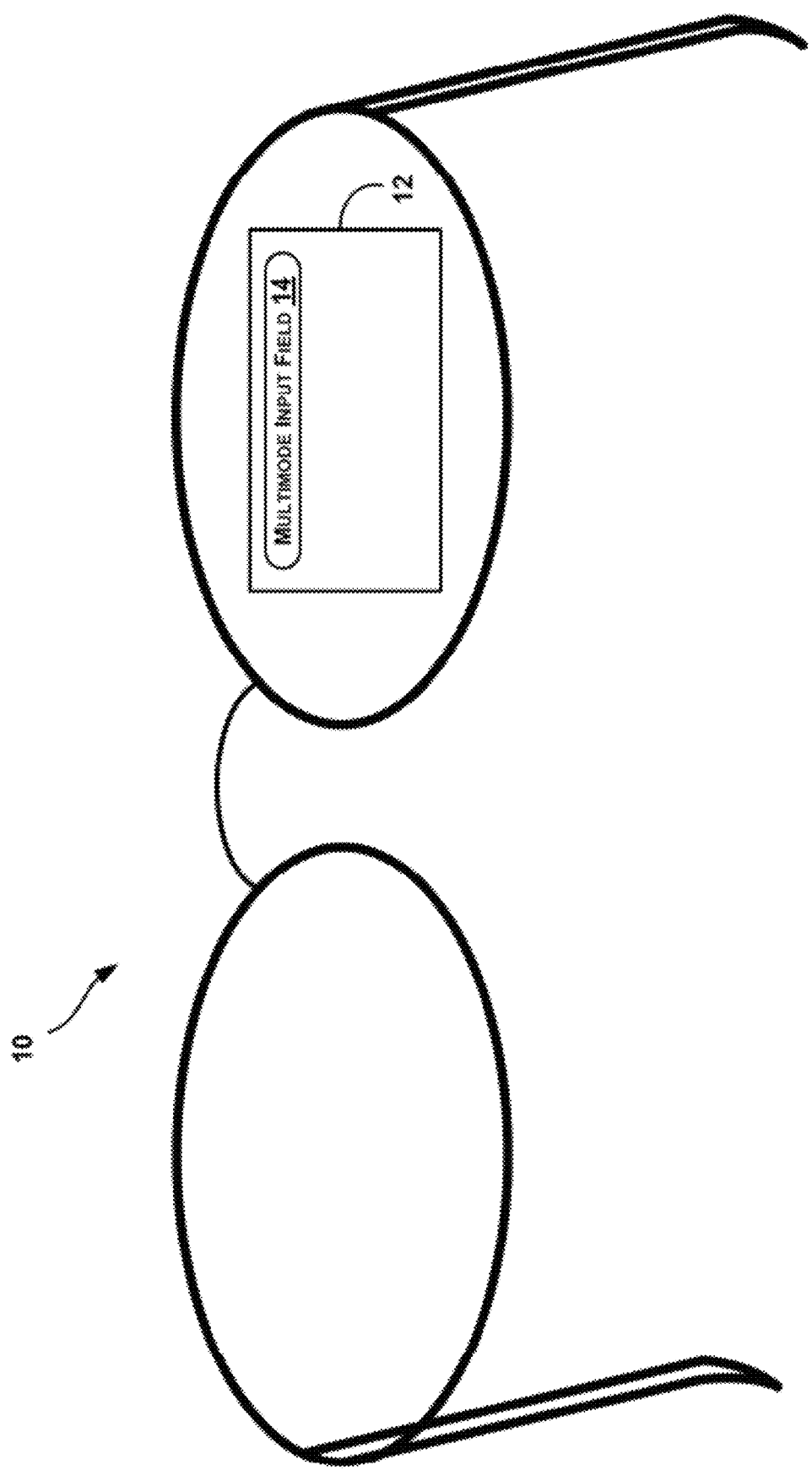
FIG. 1 is a simplified illustration of an HMD that is displaying a multimode input field.

An exemplary embodiment involves a multimode input field that may be incorporated as a graphical element in the display of a wearable computer (e.g., in a head-mountable display (HMD) of a wearable computer). FIG. 1 is a simplified illustration of an HMD that is displaying a multimode input field. As shown, a multimode input field 14 is displayed in the display 12 of HMD 10.

In an exemplary embodiment, multimode input field 14 is configured to accept and display a number of different modalities of content. The displayed content may be generated based on input data that is received from a number of different input sources. The input data on which the displayed content is based may include a number of different modalities of data. As such, the multimode input field 14 may be configured to receive typed text, text corresponding to speech in an audio signal, images from various sources, and/or video from various sources, and to provide various functions such as text-based searches, image-based searches, face detection and/or face recognition, contact look-up, and/or an application-based functions such as composing an email or editing a document. In a further aspect, the multimode input field may be moveable, resizable, and otherwise adjustable to accommodate various modalities of content from the various different input sources.

Exemplary embodiments may further provide for intelligent and automated selection of content for the multimode input field, in an effort to automatically display content that interests the wearer. In order to intelligently select input content, an exemplary wearable computer may evaluate incoming data from the various input sources for implicit information indicative of content that might be desired by a user, as well as for explicit instructions indicating content for display in the multimode input field. In addition, a wearable computer may use context information to intelligently select input content for the multimode input field. For example, an exemplary system may vary the manner in which incoming data is evaluated for implicit information and/or may allow for different sets of explicit instructions, depending upon context.

The intelligent and automatic selection of input content based on implicit information may be particularly useful in the context of wearable computers, which are often configured to receive input data from a number of different input sources, and may even receive input data from multiple input sources concurrently. Such input sources may include, but are not limited to: (a) a video camera that provides a video feed (e.g., a point-of-view video feed), (b) a still camera configured to take photographic images, which may be integrated with or separate from the video camera, (c) a microphone for acquiring audio data, (d) a keyboard for acquiring keystroke data, (e) a touchpad that provides data corresponding to gestures by a user on the touchpad, and/or (f) other input sources. These input sources may provide a number of different modalities of data such as text, audio (including audio with speech and/or non-speech audio), images, and video, among others. Accordingly, an exemplary wearable computer may monitor incoming data from some or all of these input sources, and evaluate data patterns in the incoming data in order to determine what input content is likely desirable to a wearer.

In order to provide flexibility for the user, an exemplary wearable computer may also allow a user to select content for the multimode input field via explicit user instructions or commands. In particular, the wearable computer may evaluate incoming data from its input sources for explicit instructions, and automatically initiate the corresponding actions when such instructions are received. For example, the speech "What is Joe Smith's phone number?" may be detected in audio data from a microphone, and a textual conversion of this speech may be displayed. The wearable computer may evaluate this phrase and determine that it is a contact information query. Accordingly, the wearable computer may search a contact list for the matching contact (e.g., "Joe Smith"), and display corresponding contact information in the display of the HMD.

In addition, the functionality provided by the multimode input field 14 may be varied depending on various factors, such as the modality of the currently displayed content, the input source providing data from which the displayed content is derived, current context information, and/or explicit instructions received via the various input sources. For example, when an image is displayed in the multimode input field, an image-based search or a face recognition function may be initiated. On the other hand, when text is displayed in the multimode input field, a text-based search may be initiated, or the text may be provided as input to another application (e.g., an e-mail or word processor).

In an exemplary embodiment, the multimode input field 14 may provide a highly-dynamic and flexible user experience by combining: (a) the intelligent and automatic selection of content based on the evaluation of incoming data for implicit information and/or context, (b) explicit instructions providing control over displayed content, and/or (c) dynamic functionality based on various factors.

For example, in some embodiments the multimode input field 14 may provide a viewfinder mode, in which the multimode input field is overlaid on a video or an image in the display of an HMD. The user may then be allowed to adjust the size and/or the location of the multimode input field to enclose a desired portion of the video or image. For instance, the viewfinder mode may be used to enclose a person's face or a certain object in an image. The wearable computer may then initiate a face-recognition process (or another image- or video-analysis process) for image or video content enclosed in the multimode input field. Alternatively, a different instruction may be provided, which performs object recognition on image or video content enclosed in the multimode input field, and further performs an image-based search on any object that is detected.

As another example, by monitoring incoming data from a number of input sources, the multimode input field 14 may intelligently and automatically switch modalities of input content. For instance, the multimode input field may default to display a point-of-view video feed in the absence of an explicit instruction or other implicit information indicating other content should be displayed. However, in response to a certain gesture, such as a tap and hold gesture for instance, the multimode input field may switch to a mode where it accepts a speech signal as input (e.g., the user's speech acquired via a microphone of the wearable display). Speech-to-text processing can then by applied to the speech so that a search or some other action based on the converted speech can be performed. For example, the user may ask a question such as "when is the next meeting?" and the wearable display may responsively search the user's calendar and possibly other sources as well.

While the examples described herein generally relate to implementations of a multi-mode input field by a wearable computer having an HMD, it should be understood that other implementations of a multi-mode input field are also possible. For instance, a multi-mode input field may also be implemented on a digital camera or on a smartphone. Other examples are also possible.

II. Exemplary System and Device Architecture

Figure 2:
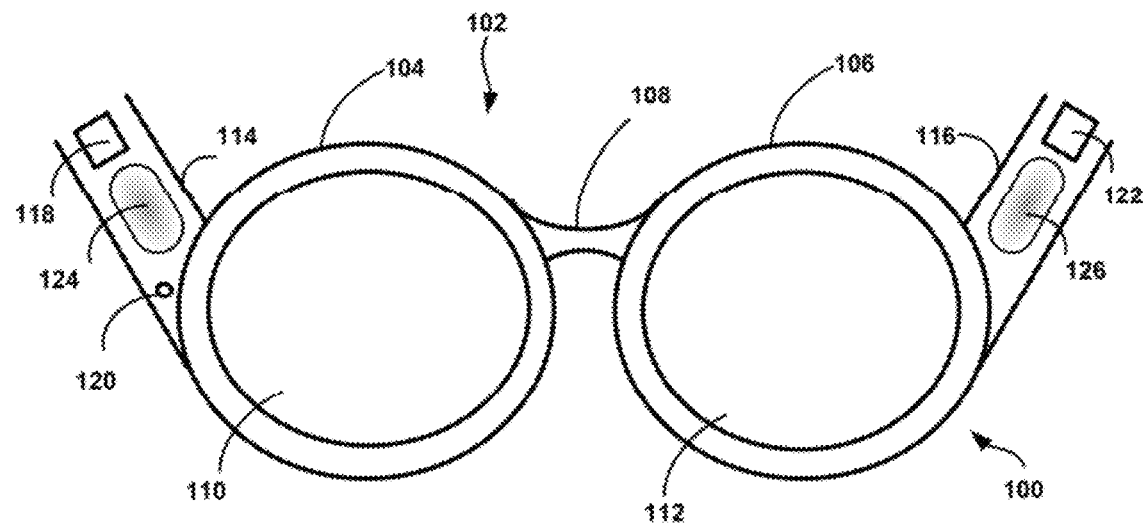
FIG. 2 illustrates an example system for receiving, transmitting, and displaying data.

FIG. 2 illustrates an example system for receiving, transmitting, and displaying data. The system 100 is shown in the form of a wearable computing device. While FIG. 2 illustrates eyeglasses 102 as an example of a wearable computing device, other types of wearable computing devices could additionally or alternatively be used. As illustrated in FIG. 2, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may be formed of any material that can suitably display a projected image or graphic. Each of the lens elements 110 and 112 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and finger-operable touch pads 124, 126. The on-board computing system 118 is shown to be positioned on the extending side-arm 114 of the eyeglasses 102; however, the on-board computing system 118 may be provided on other parts of the eyeglasses 102. The on-board computing system 118 may include a processor and memory (e.g., a non-transitory computer readable medium), for example. The on-board computing system 118 may be configured to receive and analyze data from the video camera 120 and the finger-operable touch pads 124, 126 (and possibly from other sensory devices, user interfaces, or both) and generate images for output from the lens elements 110 and 112. The memory may include program instructions that are executable to provide the functionality of exemplary systems described herein.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 2 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more of a gyroscope or an accelerometer, for example. Other sensing devices may be included within the sensor 122 or other sensing functions may be performed by the sensor 122.

The finger-operable touch pads 124, 126 are shown mounted on the extending side-arms 114, 116 of the eyeglasses 102. Each of finger-operable touch pads 124, 126 may be used by a user to input commands. The finger-operable touch pads 124, 126 may sense at least one of a position and a movement of a finger via capacitive sensing, resistance sensing, or a surface acoustic wave process, among other possibilities. The finger-operable touch pads 124, 126 may be capable of sensing finger movement in a direction parallel or planar to the pad surface, in a direction normal to the pad surface, or both, and may also be capable of sensing a level of pressure applied. The finger-operable touch pads 124, 126 may be formed of one or more translucent or transparent insulating layers and one or more translucent or transparent conducting layers. Edges of the finger-operable touch pads 124, 126 may be formed to have a raised, indented, or roughened surface, so as to provide tactile feedback to a user when the user's finger reaches the edge of the finger-operable touch pads 124, 126. Each of the finger-operable touch pads 124, 126 may be operated independently, and may provide a different function.

Figure 3:
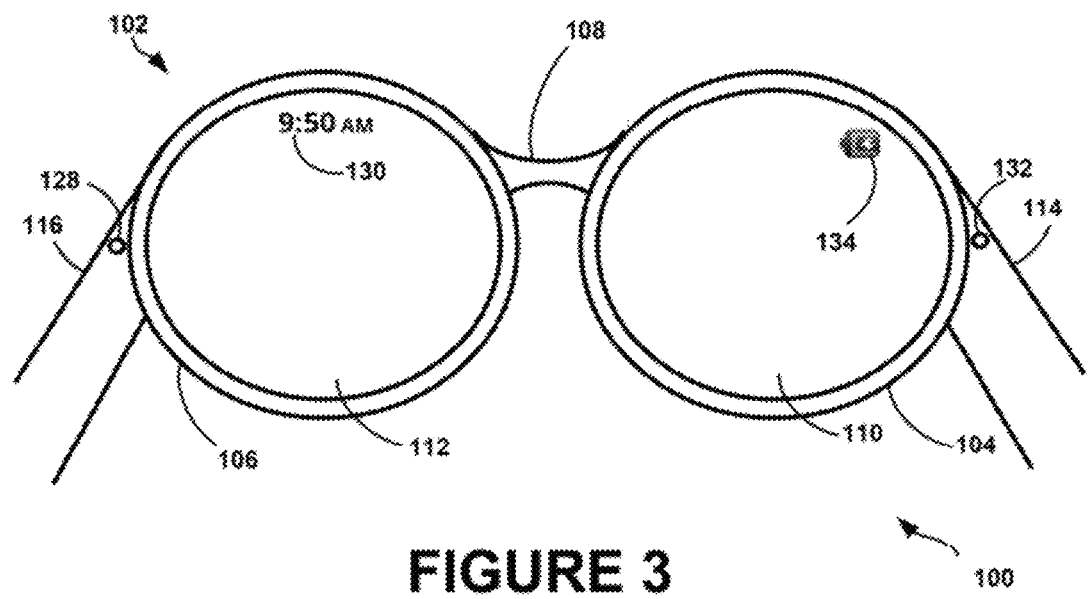
FIG. 3 illustrates an alternate view of the system of FIG. 2.

FIG. 3 illustrates an alternate view of the system of FIG. 2. As shown in FIG. 3, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110 and 112 may act as a combiner in a light projection system and may include a coating that reflects the light projected onto them from the projectors 128 and 132. In some embodiments, a special coating may not be used (e.g., when the projectors 128 and 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104 and 106 for driving such a matrix display. Alternatively or additionally, a laser or LED source and scanning system could be used to draw a raster display directly onto the retina of one or more of the user's eyes. Other possibilities exist as well.

Figure 4:
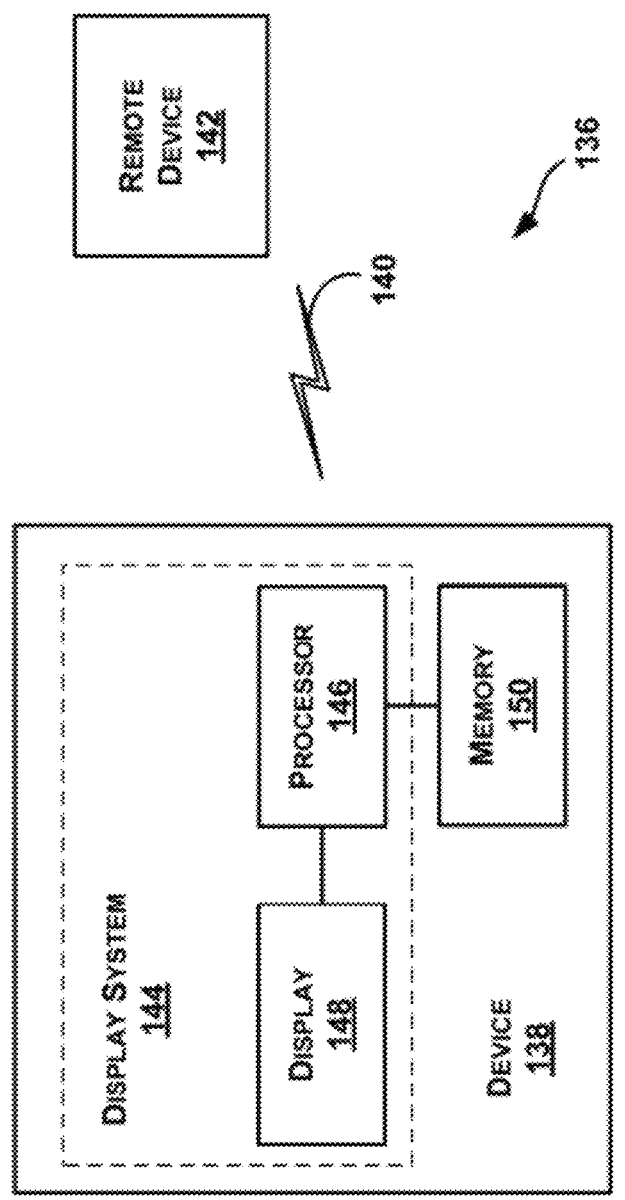
FIG. 4 illustrates an example schematic drawing of a computer network infrastructure.

FIG. 4 illustrates an example schematic drawing of a computer network infrastructure. In one system 136, a device 138 communicates using a communication link 140 (e.g., a wired or wireless connection) to a remote device 142. The device 138 may be any type of device that can receive data and display information corresponding to or associated with the data. For example, the device 138 may be a heads-up display system, such as the eyeglasses 102 described with reference to FIGS. 1 and 2.

Thus, the device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a microprocessor or a digital signal processor, for example.

The device 138 may further include on-board data storage, such as memory 150 coupled to the processor 146. The memory 150 may store software that can be accessed and executed by the processor 146, for example.

The remote device 142 may be any type of computing device or transmitter including a laptop computer, a mobile telephone, etc., that is configured to transmit data to the device 138. The remote device 142 and the device 138 may contain hardware to enable the communication link 140, such as processors, transmitters, receivers, antennas, etc.

In FIG. 4, the communication link 140 is illustrated as a wireless connection; however, wired connections may also be used. For example, the communication link 140 may be a wired link via a serial bus such as a universal serial bus or a parallel bus. A wired connection may be a proprietary connection as well. The communication link 140 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 142 may be accessible via the Internet and may comprise a computing cluster associated with a particular web service (e.g., social-networking, photo sharing, address book, etc.).

III. Exemplary Methods

Figure 5:
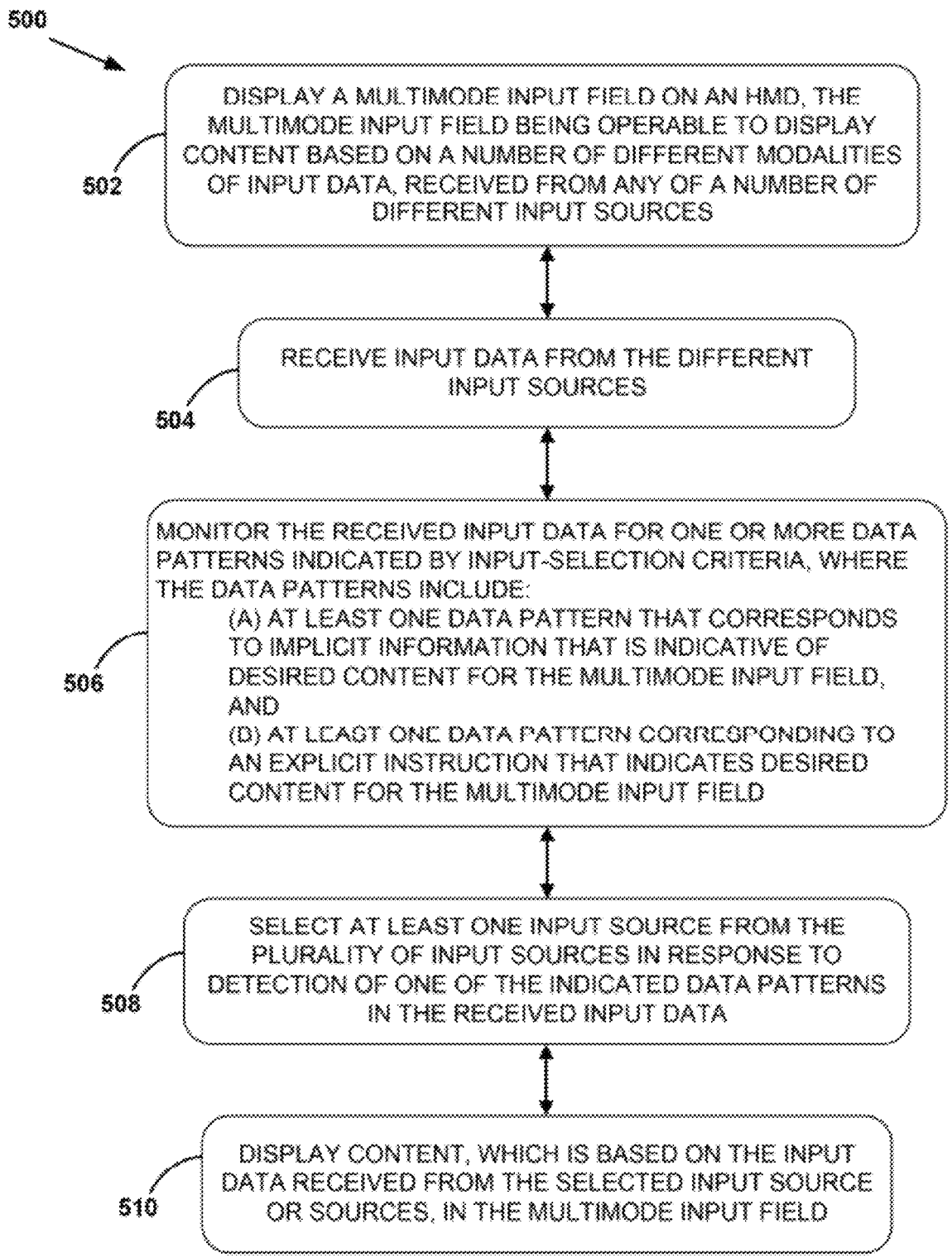
FIG. 5 is a flow chart illustrating a method according to an exemplary embodiment.

FIG. 5 is a flow chart illustrating a method according to an exemplary embodiment. In particular, method 500 involves a wearable-computing system displaying a multimode input field on an HMD, which is operable to display content based on a number of different modalities of input data, as shown by block 502. The different modalities of input data that are displayed in the multimode input field may be received from any of a number of different input sources. Further, in an exemplary embodiment, the modalities of input data include two or more of audio, image, text, and/or video.

Method 500 further involves the wearable computing system receiving input data from the different input sources, as shown by block 504. Further, the system monitors the received input data for one or more data patterns indicated by input-selection criteria, as shown by block 506. In an exemplary embodiment, the data patterns include: (a) at least one data pattern that corresponds to implicit information that is indicative of desired content for the multimode input field and (b) at least one data pattern corresponding to an explicit instruction that indicates desired content for the multimode input field.

The wearable computing system may then select at least one input source from the plurality of input sources in response to detection of one of the indicated data patterns in the received input data, as shown by block 508. In particular, the wearable computing system may detect a data pattern that matches a data pattern indicated by a given input-selection rule from the input-selection criteria, and responsively select the input source or sources which the input-selection rule indicates to correspond to the detected data pattern. The wearable computing system may then display content, which is based on the input data received from the selected input source or sources, in the multimode input field, as shown by block 510.

In an exemplary embodiment, the process of selecting an input source or sources for the multimode input field may involve the selection of content for the multimode input field. In particular, the wearable computing system may determine, based on detected data patterns, what content should be displayed in the multimode input field. An input source may then be selected that provides input data upon which the displayed content can be based. In some embodiments, the input data from the selected input source may be directly fed to the multimode input field, such as when video from a video camera is displayed in the multimode input field. Similarly, text from a keyboard may be displayed in the multimode input field. Other examples are also possible.

In a further aspect, the modality of the displayed content may be the same as or different from the modality of the input data received from the selected input source. For example, text from a microphone or another audio source may be converted to text for display in the multimode input field. As another example, a screen capture from video may be displayed in the multimode input field. Other examples are possible.

In another aspect, the selected input source may or may not be the source of the input data in which the data pattern was detected. For example, an input-selection rule may specify that when a certain data pattern is detected in audio data a video camera or a keyboard should be selected as an input source for the multimode input field. Other examples are also possible.

IV. Selection of Input Sources and Content for a Multimode Input Field

FIG. 6 is a functional block diagram illustrating a wearable computing system according to an exemplary embodiment. Exemplary system 600 is configured to intelligently select input content for a multimode input field, which is sent via a display interface 603 for display on a display 601. According to an exemplary embodiment, content for the multimode input field may be based on a variety of modalities of input data, which may be received from any of a number of different input sources.

More specifically, exemplary system 600 is configured to monitor incoming data from a number of input sources 604 for implicit information that may be used for the intelligent selection of input content for the multimode input field. In addition, the incoming data may include explicit input-content instructions, which specify the content for the multimode input field, as well as instructions corresponding to actions on or actions related to the content displayed in the multimode input field. Accordingly, the exemplary system 600 may be configured to detect input-content instructions and other explicit instructions, and to responsively initiate the actions corresponding to such instructions.

A. Sources of Input Data

As shown, exemplary system 600 includes a number of input-source interfaces 602 for receiving data from input sources 604. In the illustrated embodiment, the input sources 604 include, for example, an application 606, a microphone 608, a keyboard 610, a camera 612, and a touchpad 614. A given input-source interface 602 may be configured to interface with and receive data from a single input source 604. Additionally or alternatively, a given input-source interface 602 may be configured to simultaneously interface with multiple input sources 604.

Configured as such, exemplary system 600 can receive a number of different modalities of input data from input sources 604. In the illustrated embodiment, system 600 may receive, for example, audio data from microphone 608, text data from keypad 610, video data and/or image data from camera(s) 612, and/or gesture data from touchpad 614. A system may be configured to receive other modalities of data, in addition or in the alternative to those described, without departing from the scope of the invention.

B. Selection Criteria for Input Content

In the illustrated embodiment, system 600 includes an input selection module 616, which generally functions to evaluate the input data from the various input sources 604. In particular, input selection module 616 may be configured to receive input data from the input sources 604 via input source interfaces 602.

The input selection module 616 may further determine what content should be displayed in the multimode input field. Accordingly, to determine what content should be displayed in the multimode input field, input selection module 616 monitors input data for implicit information that is indicative of content the wearer may want to view. To support this functionality, selection criteria database 618 may provide a number of input-selection rules that help determine when implicit information may be used to select an input source. More specifically, an input-selection rule may associate an input source or input sources 604 to be selected when a certain data pattern is detected. Accordingly, when a matching data pattern is detected in the input data received from input sources 604, the input selection module 616 may select the input source indicated by the corresponding input-selection rule.

More specifically, in order to determine what content should be displayed in the multimode input field, input selection module 616 monitors incoming data from input sources 604 for the data patterns indicated by the various input selection rules. The input selection module 600 may then respond to the detection of a matching data pattern by selecting at least one input source 604 for the multimode input field. The selected input source is typically a source that either provides the desired content directly, or provides data that can be used to generate the desired content. The content which is displayed in the multimode input field may accordingly be based on input data from the selected input source.

In a further aspect, input selection module 616 may base the selection of an input source 604 for the multimode input field on other factors, in addition to implicit information in incoming data (e.g., data patterns in data from input sources 604). For example, input selection module 616 may use context information (e.g., context signals) from context information sources 622 to further tailor the content displayed in the multimode input field to the estimated preferences of the user.

Further, input selection module 616 is also configured to select content for the multimode input field based on explicit instructions received via input sources 604. In the absence of an explicit instruction to display certain content, the exemplary system 600 may intelligently and automatically determine content for the multimode input field that is believed to be desired by the user. As such, the exemplary system is flexible in that the user can also indicate the specific content they wish to view in the multimode input field.

In some cases, input selection module 616 may detect multiple concurrent data patterns in the input data. For example, input selection module 616 may detect a first data pattern in data from a first source and, simultaneously, detect a second data pattern in data from a second source. As such, selection criteria 618 may provide input-selection rules that prioritize certain data patterns and/or certain input sources.

For instance, selection criteria 618 may prioritize detection of speech in audio data from microphone 608 over other data patterns detected in video data from camera 612. Accordingly, some embodiments may be configured to display a text conversion of speech whenever speech matching a data pattern is detected in incoming audio data, regardless of whether there is also a matching data pattern in incoming video data. Similarly, if input selection module 616 detects that a user is entering text via a keyboard 610, this text may be displayed, even when there is a matching data pattern in incoming audio data and/or in incoming video data; for example, where keyboard data is given priority over audio data and video data by selection criteria 618.

In a further aspect, selection criteria 618 may provide input-selection rules that prioritize certain data patterns when multiple matching data patterns are detected from a common input source. For instance, when explicit commands are received in audio data, the explicit commands may be given priority over implicit information in the audio data from input sources 604. As one specific example, input-selection criteria 618 may specify that when a user says "show video" (e.g., when "show video" is detected in audio data from microphone 608), then this should be interpreted as an explicit command to select camera 612 as the input source for the multimode input field, and display video from camera 612 in the multimode input field. The selection criteria 618 may specify that this selection rule takes precedence over another selection rule, which specifies that when speech is detected, it should be displayed. Therefore, when speech is detected in such an embodiment, the speech will be analyzed for an explicit command such as "show video," and if no explicit command is detected, then a text conversion of the speech is displayed in the multimode input field.

It should be understood selection criteria 618 may specify other hierarchies and/or other prioritizations of input sources and/or data patterns, without departing from the scope of the invention. Thus, selection criteria 618 may be based on one or more objectives in a specific implementation.

In a further aspect, there may be scenarios where the selection criteria 618 indicates that multiple input sources 604 should be selected. For example, a scenario may exist where text is detected in input data from keyboard 610 and speech is detected in audio data from microphone 608. In this scenario, speech-to-text module 626 may convert the speech from the audio data to text, and this text may be merged with the text from the keyboard for display in the multimode input field. As another example, scenarios may exist where video or an image from camera 612 is displayed in the multimode input field, and text is overlaid on top of the video or image. In such a scenario, the text may be obtained from the keyboard 610 and/or obtained via speech-to-text module 626 converting speech in audio data from microphone 608. Many other combinations of multiple input sources, which may include a variable number of input sources, are also possible.

C. Selection of Content Based on Implicit Information

As noted, an exemplary system may select an input source for the multimode input field based on implicit information extracted from input data from the various possible input sources. This implicit information may correspond to certain data patterns in the input data.

In a system that includes a microphone or other audio source as an input source, the input-selection module 616 may monitor incoming audio data for various data patterns, according to the input-selection criteria. The input-selection criteria may specify numerous types of data patterns, which may vary in complexity and/or form.

For example, an exemplary input selection module 616 may monitor audio data for: (i) patterns that are indicative of human speech in general, (ii) patterns that are indicative of human speech by a particular person (e.g., the owner of the device, or a friend or spouse of the owner), (iii) patterns that are indicative of a certain type of human speech (e.g., a question or a proposition), (iv) patterns that are indicative of human speech inflected with a certain emotion (e.g., angry speech, happy speech, sad speech, and so on), (v) patterns that are indicative of human speech associated with a certain context (e.g., a pre-recorded announcement on a subway car or a statement typically given by a flight attendant on an airplane), (vi) patterns that are indicative of a certain type of human speech (e.g., speech that is not in a speaker's native language), (vii) patterns indicative of certain types of non-speech audio (e.g., music) and/or of non-speech audio with certain characteristics (e.g., a particular genre of music), and/or (viii) other types of audio-data patterns.

As a specific example, an exemplary system may be configured to monitor audio data for data patterns that include or are indicative of speech by a particular user, who is associated with the system (e.g., the owner of a wearable computer). When speech by the wearer is detected in incoming audio data, the system may infer that the wearer is saying something that should be displayed in the multimode input field. Accordingly, the speech-to-text module 626 may convert the speech to corresponding text, which may then be displayed in the multimode input field. In some embodiments, the audio data in which speech is detected may be analyzed in order to verify that the speech is actually that of the user associated with the system.

Further, when speech by a wearer is detected, and possibly in other scenarios as well, the detected speech may be analyzed for information that may imply certain content might be desirable. For instance, when a wearer says a person's name, an exemplary system may search various sources for the named person's contact information or other information related to the named person. The system may do so when, for example, the person's name is stated in the midst of a conversation, and the user is not explicitly requesting the person's contact information.

If contact information for the named person is located, the contact information may be displayed in the multimode input field. Furthermore, the contact information may be displayed in various forms. For example, the multimode input field may display phone numbers, an email, an address, a photograph of the contact, or possibly even the contact's profile on a social network, among other types of contact information.

In the event that analysis of the speech does not provide implicit information that can be used to select an input source, the multimode input field may by default display text corresponding to the detected speech. Alternatively, the default action may be to not display anything, or if the multimode input field is currently displaying content, to leave the field in its current state. Other default actions are also possible.

Implicit information from video and/or image data may also be used to select an input source for the multimode input field. For example, input selection criteria 618 may include an input selection rule indicating that the video camera should be selected upon detection of a sequence of frames in video from the video camera, which is characteristic of fixation on a scene. Accordingly, input selection module 616 may monitor incoming point-of-view video data from camera 612 for video that is characteristic of fixation (e.g., video indicative of a user stopping and staring at a scene or an object). For example, when input selection module 616 detects that a sequence of a predetermined number of frames in the point-of-view video remains substantially the same, or has an object remain in substantially the same location in the frame, the input selection module 616 may conclude that the user is likely interested in the scene or object, and may accordingly base the input content for the multimode input field on this scene or object.

Numerous types of data patterns may be identified as providing implicit information, which may be used to select an input source and/or input content for the multimode input field. For example, a person's name may be detected in speech during a wearer's conversation with a friend, and, if available, the contact information for this person may be displayed in the multimode input field.

Similarly, a person could be using a keyboard 610 to edit a document in a word-processing application, which is open in a separate window from the multimode input field. Accordingly, input selection module 616 may monitor the incoming text data for the document. If a person's name is detected in the incoming text data, the input selection module 616 may select the keyboard 610 as the input source for the multimode input field (while continuing to input the received text to the word processing application). The input selection module

616 may then search for the contact information for this person and, if available, display the contact information in the multimode input field.

As another example, one of the data patterns may correspond to audio including a phrase that can be characterized as a question. When a question is detected, the input selection module 616 may responsively select a question-handler application as the input source for the multimode input field. Output from the question-handler application (e.g., an answer to, or other information related to, the question posed by the wearer) may then be displayed in the multimode input box, or possibly provided to the wearer in other ways (e.g., elsewhere in the HMD, or possible via speakers if the output includes audio).

For instance, input selection module 616 may detect the phrase "what am I doing tomorrow afternoon" in incoming audio data. The input selection module 616 may analyze this phrase, determine it constitutes a question, and input the phrase to the question-handler application. The question-handler application may then evaluate the question and output responsive information to the multimode input field. For instance, the question-handler application may search information sources such as the wearer's calendar, email, and/or social networking accounts, in order to determine the wearer's schedule for the afternoon of the next day. The question-handler application may then output responsive information such as a text description of an event, activity, or meeting, a calendar entry, and/or a website associated with an event scheduled that afternoon, among others.

As another example, a data pattern in audio data may provide implicit information when it includes a speech pattern or speech characteristics that substantially match those of certain pre-recorded speech, such as the recorded announcements that are typically played on a subway. For instance, when a subway announcement is detected in incoming audio data, input selection module 616 may interpret this as an indication that the wearer is on a subway. As such, the input selection module 616 may display a locally-stored file or a web-based mapping application as the input source, so that a subway map can be displayed in the multimode input field. Further, a GPS signal source may also be selected as an input source, so that the current location can be displayed and tracked on the subway map.

There are numerous examples of other data patterns that may correspond to implicit information that is indicative of content desired by a user. For example, input selection module 616 may detect a data pattern in incoming audio data that is characteristic of car engine noise (and possibly characteristic of a particular type of car, such as the type of car owned or registered to the wearer). The input selection module 616 may interpret this as an indication that the wearer is in a car and responsively launch a navigation system or mapping application in the multimode input field.

As another example, input selection module 616 may detect a data pattern in incoming audio data that is characteristic of announcements during a commercial airline flight (e.g., flight-attendant safety briefings). The input selection module 616 may interpret this as an indication that the wearer is on a commercial airline flight, and responsively display a map with flight progress and/or flight status information.

As yet another example, input selection module 616 may detect a data pattern in incoming audio data that is characteristic of music. The input selection module 616 may interpret this as an indication that the wearer is listening to a song, and may responsively send the incoming audio data to a song-recognition application, which may output information such as the name of the song, the performing artist or artists, the name of an album that includes the song, an image associated with the song or artist (e.g., an album cover), and information for purchasing and/or downloading the identified song. This information may then be displayed in the multimode input field.

Additionally or alternatively, input selection module 616 may search a library of song files associated with the system and/or the wearer, and determine whether the library includes the song. If the song is found in the library, then various actions may be taken. For instance, a prompt to play the song may be displayed in the multimode input field. Various alternative actions are possible if the song is not found in the library. For example, information for purchasing and/or downloading the song may be displayed in the multimode input field.

As one more example, input selection module 616 may detect a data pattern in incoming audio data that is characteristic of a person speaking in a foreign language (e.g., a language other than the wearer's native language), and responsively display a text translation of speech in the foreign language. Other examples are also possible.

D. Selection of Content Based on Context Information

In a further aspect, input selection module 616 may be configured to select an input source and/or to select input content for multimode input field, based on context. In order to use context information in the selection process, input selection module 616 may coordinate with context evaluation module 620, which is configured to evaluate context signals from one or more context information sources 622. For example, context evaluation module 620 may determine a context, and then relay the determined context to input selection module 616. Input selection module 616 may then consider the determined context when selecting an input source and/or determining input content for the multimode input field.

To facilitate the use of context information, selection criteria 618 may provide input selection rules that specify, for various contexts or combinations of contexts, which input source or sources should be selected and/or what type of input content should be displayed in the multimode input field. For instance, selection criteria 618 may indicate a first input source should be selected when a given data pattern is detected, in a certain context or contexts. However, selection criteria 618 may specify that a second input source should be selected when the same data pattern is detected in a different context.

As a specific example, selection criteria 618 may specify that camera 612 should be selected when a certain data pattern is detected, and that a point-of-view video feed from camera 612 should be displayed in the multimode input field. However, when the context is determined to be "in the dark," the wearable computer may infer that a point-of-view video feed would likely be a black screen, and thus be of little use to the wearer. Accordingly, selection criteria 618 may specify that when the same data pattern is detected and the context is determined to be "in the dark," then the wearable computer should select an alternative source, such as keyboard 610 or microphone 608, and that text based on data from the alternative source should be displayed in the multimode input field.

In some embodiments, a wearable computer may be configured to adjust the manner in which input sources are selected based on context. For example, a wearable computer might be configured, in certain contexts, to filter out speech by people other than a user that is associated with the wearable computer. However, in some contexts, such as an "in a classroom" or an "in a lecture hall" context, where the wearer might be listening very intently to speech by someone else, the wearable computer might change the selection criteria 618 to select a microphone 608 as an input source for the multimode input field when speech by another person is detected in audio data from the microphone.

In a further aspect, an input selection rule may indicate that the same input source should be selected in two different contexts, but that the manner in which input content is displayed in the multimode input field should vary between the two contexts. To do so, an exemplary wearable computer may use different processes, which vary the manner in which data from the input source is used to generate input content for display in the multimode input field.

In an exemplary embodiment, context evaluation module 620 may determine context using various "context signals," which may be any signals or information pertaining to the state or the environment surrounding the system or a user associated with the system. As such, a wearable computer may be configured to receive one or more context signals, such as location signals, time signals, environmental signals, and so on. These context signals may be received from, or derived from information received from, context information sources 622 and/or other sources.

As an example, selection criteria 618 may specify that keyboard 610 or touchpad 614 should generally be selected as the input source when a certain data pattern is detected. However, when a temperature context signal indicates that it is below a certain temperature (e.g., 32 degrees Fahrenheit), the wearable computer may infer that the wearer is likely wearing gloves and that use of the keyboard or the touchpad may therefore be difficult. Accordingly, selection criteria 618 may specify that when the same data pattern is detected and the context is determined to be "below 32 degrees" and/or "wearing gloves," for instance, then the wearable computer should select an alternative source. In particular, microphone 608 may be selected in order to allow the wearer to provide information for the multimode input field via speech, which may be easier for the wearer to do when it is cold and/or they are wearing gloves.

Many types of information, from many different sources, may serve as context signals or provide information from which context signals may be derived. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information. Those skilled in the art will understand that the above list of possible context signals and sources of context information is not intended to be limiting, and that other context signals and/or sources of context information are possible in addition, or in the alternative, to those listed above.

In some embodiments, determining context may involve calculating a quantitative or qualitative value of a single context signal (e.g., the time of the day, a current location, a user status). The context may also be determined based on a plurality of context signals (e.g., the time of day, the day of the week, and the location of the user). In other embodiments, the context evaluation module 620 may extrapolate from the information provided by context signals. For example, a determined user-context may be determined, in part, based on context signals that are provided by a user (e.g., a label for a location such as "work" or "home", or user-provided status information such as "on vacation").

In a further aspect, context information sources 622 may include various sensors that provide context information. These sensors may be included as part of or communicatively coupled to an exemplary system 600. Examples of such sensors include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others.

An exemplary system 600 may also be configured to acquire context signals from various data sources. For example, context evaluation modules may be configured to derive information from network-based weather-report feeds, news feeds and/or financial-market feeds, a system clock providing a reference for time-based context signals, and/or a location-determination system (e.g., GPS), among others.

In another aspect, an exemplary system 600 may also be configured to learn over time about a user's preferences in certain contexts, and to update selection criteria 618 accordingly. For example, whenever an explicit input-content instruction is received, a corresponding entry may be created in historical context database 624. This entry may include the input source and/or input content indicated by the input-content instruction, as well as context information that is available at or near the receipt of the input-content instruction.

Context evaluation module 620 may periodically evaluate historical context database 624 and determine a correlation exists between explicit instructions to select a certain input source and/or certain input content, and a certain context. When such a correlation exists, selection criteria 618 may be updated to specify that the input source should be automatically selected, and/or that the input content should be automatically displayed, upon detection of the corresponding context. For example, an exemplary system may add an input-selection rule to selection criteria 618 that associates a certain context with: (a) a certain data pattern in incoming input data and certain content that is typically detected in conjunction with the certain context, and (b) certain content that a user has typically selected for display via explicit instructions, in conjunction with the certain context.

Additionally or alternatively, an exemplary system may be configured for an "on-the-fly" determination of whether a current context has historically been associated with certain input sources and/or certain input content. In particular, input selection module 616 may compare a current context to historical context data in historical context database 624, and determine whether certain input sources and/or certain input content have historically been correlated with the current context. If a correlation is found, then input selection module 616 may automatically select the associated input source and/or display the associated input content in the multimode input field.

For example, by analyzing historical context data in historical context database 624, an exemplary system may learn that a user generally launches a garage-door opener application when the user is in their car and looking at their garage door (as determined by evaluation of a point-of-view video feed from camera 612). Accordingly, the system may update selection criteria 618 to include an input-selection rule that indicates to launch the garage-door opener application, whenever the current context is determined to be "in a car" and "looking at the garage door."

It should be understood that herein, a "module," such as input selection module 616 or context evaluation module 620, may simply be program instructions that are executable to provide functionality of the module described herein. Alternatively, a module may take the form of hardware (e.g., a chipset), software, and/or firmware within an exemplary system, or may take another form altogether.

E. Explicit Selection of Input Content

As noted, input selection module 616 may be further configured to receive an explicit input-content instruction, which indicates a specific input source to use for the multimode input field. Explicit input-content instructions may be received via input data from input sources 604 and/or may be provided from other sources. Such input-content instructions are typically indicative of an explicit request by a user of the system, and thus may override any implicit information detected in the input data.

Explicit input-content instructions may take various forms, including but not limited to: (a) a speech command received in audio data from microphone 608, (b) a keystroke-based command from keyboard 610, (c) a hand signal captured in a point-of-view video from camera 612, and/or (d) data corresponding to a certain gesture or sequence of gestures on touchpad 614.

In an exemplary embodiment, input selection module 616 may be configured to handle scenarios where implicit information is detected at or near when an explicit input-content instruction is received. Typically, the input selection module will resolve this situation by acting on the input-content instruction and ignoring the implicit information. For instance, in response to receipt of the input-content instruction, the input selection module 616 may cease monitoring of the input sources 604 for the data patterns indicated by the selection criteria 618, and instead display the content indicated by the input-content instruction in the multimode input field.

To act upon speech commands, for example, speech-to-text module 626 may convert speech that is detected in incoming audio data to corresponding text. This text may then be analyzed in order to detect when the text matches a defined speech command. (Alternatively, the audio data itself may be compared to a library of speech commands, in order to determine when a speech command is included in the audio data.) When a match is detected, an action associated with the speech command may be initiated. For example, a user may say "select video" in order to output video from camera 612 to the multimode input field. As another example, a user may say "launch" and then say an application name in order to launch the named application in the multimode input field. For instance, the user may say "launch word processor," "launch e-mail," or "launch web browser." When input selection module 616 detects these speech commands, it may responsively launch a word-processing application, an e-mail application, or a web browser, respectively, in the multimode input field. Many other examples are also possible.

In some scenarios, an indication of content for the multimode input field may be received in speech and/or text that follows a speech command or another explicit instruction. As one specific example, the user may say "contact information" and then say "David Smith." The phrase "contact information" may be defined as a speech command that launches a search for the contact information of a subsequently specified contact. Accordingly, input selection module 616 may select a contact list application, a social networking application, and/or other sources of information related to a user's contacts or a user's friends, as an input source for the multimode input field.

Input selection module 616 may then search the selected input source for the requested contact information. For example, if the user's contact list is selected as the input source, the input selection module 616 may use the subsequent speech (e.g., "David Smith") to search the user's contact list. Then, if contact information is found for a "David Smith," this contact information may be displayed in the multimode input field. Furthermore, various types of contact information may be displayed. For example, the multimode input field may display phone numbers, an email, an address, a photograph of the contact, or possibly even the contact's profile on a social network, among other types of contact information.

As another specific example, when input selection module 616 detects an "open" speech command followed by a file name, the input selection module 616 may select the particular application that is appropriate to open the file as the input source, launch the selected application in the multimode input field, and then open the named file in the application. As an additional example, the user may say "search" and then state or type the terms to be searched, or identify other content to be searched, such as an image, for example. When input selection module 616 detects such a "search" command, it may responsively open a search application in the multimode input field, and input the subsequently stated terms or subsequently identified content to the search application.

As the above examples illustrate, speech commands may directly identify the input source or sources to select (e.g., a "select video" instruction), or may identify an input source by specifying an action that involves the input source (e.g., a "contact information" or "search" instruction). Many other types of speech commands may identify the input source by way of the action associated with the command.

In some embodiments, input-content instructions may be less specific about which input source to select and/or what content to display in the multimode input field. As an example, a "question" command may launch the question-handler application, which may vary the selected input source and/or the displayed content, depending upon the particular question. Other examples are also possible.

Further, certain input sources may be selected and/or certain content may be displayed in response to implicit information in incoming input data, as well as in response to an explicit instruction. For example, as described above, an exemplary system may detect speech in a foreign language and automatically display a translation of the speech in the multimode input field. An exemplary system may also allow this functionality to be selected with an explicit "translate" command (e.g., a wearer speaking the phrase "translate from French to English").

In addition to speech commands, an exemplary system may allow a user to provide explicit instructions via other input sources, such as keyboard 610 and/or touchpad 614. Like explicit speech commands, explicit instructions received via other input sources 604 may include input-content instructions to select a certain input source and/or to display certain content in the multimode input field, as well explicit instructions to perform other actions.

F. Drag and Drop Content Selection for the Multimode Input Field

In some embodiments, input content for the multimode input field may be specified via a drag and drop instruction, which corresponds to a drag and drop action by the user. FIG. 7 is a simplified illustration of an HMD during an exemplary drag and drop action. In particular, FIG. 7 illustrates a display 701 of an HMD 702, which is displaying a multimode input field 14 as well as an application 704. As shown, the user may perform a drag and drop action by selecting content 703 from application 704, and then dragging and dropping the content 703 in multimode input field 14.

In an exemplary embodiment, a drag and drop action may be performed on a touchpad, which controls the movement of a selection icon 706 within the display of the HMD. As such, a drag and drop instruction may correspond to various gestures or combinations of gestures on a touchpad. For example, selection icon 706 may be moved over content 703. A single-tap, double-tap, or tap and hold gesture may then be used to select content 703, before a swiping gesture is used to drag and drop content 703 in multimode input field 14. It is also possible that a drag and drop instruction may correspond to other gestures, and/or may correspond to actions on other input sources (e.g., keystrokes on a keyboard, a voice command, and/or hand gestures detected in a video feed, among others). It should be understood that while selection icon 706 is illustrated as taking the form of a pointer, the form of the selection icon may vary, and generally may be selected as a matter of engineering design choice.

V. Displaying Content in the Multimode Input Field

Figure 8A:
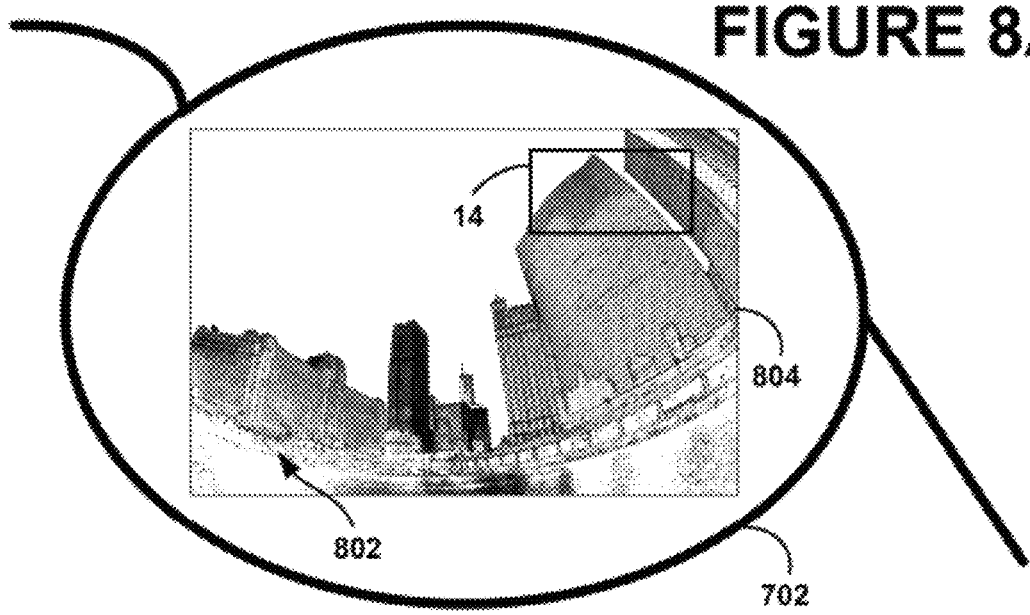
FIG. 8A is an illustration of an HMD displaying a multimode input field that encloses a portion of a displayed image.

In an exemplary embodiment, a video and/or an image may be displayed in an HMD such that the multimode input field encloses only a portion of the video or image. For example, FIG. 8A is an illustration of an HMD displaying a multimode input field that encloses a portion of a displayed image. In particular, FIG. 8A shows the HMD 702 displaying an image 802 in a full-screen mode, where the image 802 is sized to occupy substantially all of display 804. As such, multimode input field 14, which is also displayed on display 804, encloses only a portion of the image 802. It should be understood that the multimode input field may enclose a portion of a video or image that is not displayed in a full-screen mode, but is larger than the multimode input field, without departing from the scope of the invention.

Figure 8B:
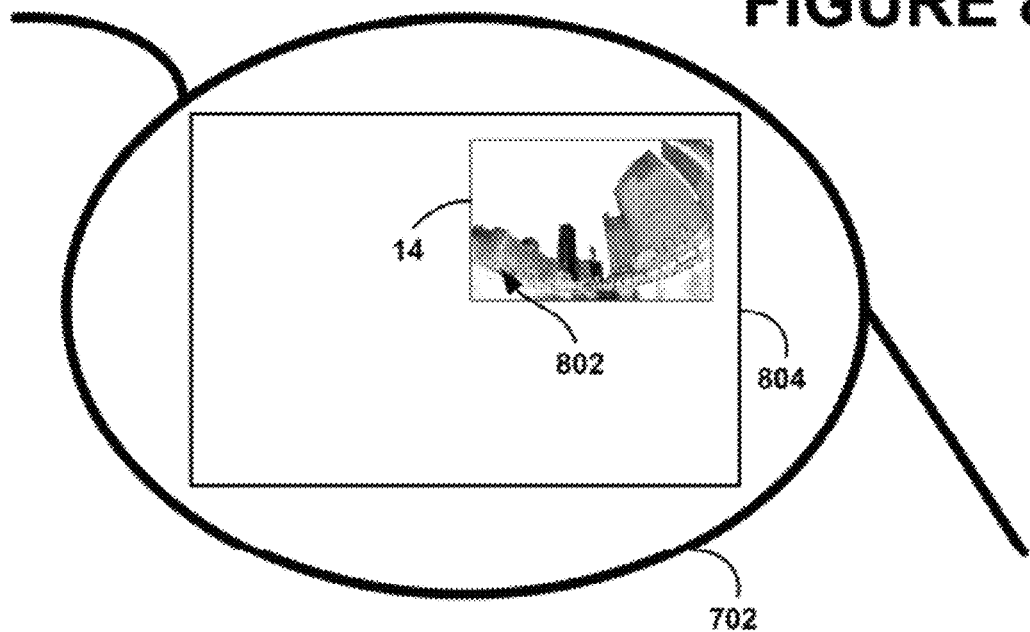
FIG. 8B is an illustration of an HMD displaying an image within the multimode input field.

A video and/or an image may additionally or alternatively be displayed in an HMD such that the multimode input field substantially encloses the video or image. For example, FIG. 8B is an illustration of an HMD displaying an image within the multimode input field. In particular, FIG. 8B shows HMD 702 displaying a version of image 802 that is sized to fit entirely within multimode input field 14.

In a further aspect, an exemplary embodiment may allow a user to switch between a mode where a video or image is enclosed by the multimode input field, and a mode where the video or image is increased in size (or the multimode input field is reduced in size) such that the multimode input field encloses only a portion of the video or image. For example, a certain gesture on a touchpad, or a command received via another input source, may allow a user to switch between these modes.

Furthermore, in some scenarios, text may be overlaid on video or on an image that is displayed in the multimode input field. In such a scenario, the text may be obtained from the keyboard 610, obtained via conversion of speech in audio data from microphone 608 or another audio source, obtained from a cut and paste instruction to paste text from another application in the multimode input field, and/or obtained from another source of text.

In some embodiments, an exemplary system may be configured to automatically adjust the size of the multimode input field to fit the content being displayed in the field. For example, if an image is selected for display in the multimode input field, the field may be sized to fit the image. Other examples are also possible.

In a further aspect, the appearance of the multimode input box in a display may vary. For example, as shown in FIGS. 8A and 8B, the multimode input field may be displayed as a rectangular box. However, the multimode input field may take on various different shapes, without departing from the scope of the invention. Other variations in the manner in which the multimode input field is displayed are also possible.

VI. Exemplary Functionality Provided by the Multimode Input Field

Various types of functions or actions may be provided or accessed via an exemplary multimode input field. For example, various search functions, such as text-based search or an image-based search may be initiated on input content in the multimode input field. Additional functions provided by the multimode input field may include face-detection or face-recognition functionality, use of various applications in the multimode input field, language translation functions, among others.

In one aspect, the functionality provided by the multimode input field may vary based on the modality of the content being displayed. For example, if an image is displayed, an exemplary wearable computer may provide image-based search functionality and/or other image-based functionality. If, on the other hand, text is displayed, the wearable computer may provide text-based search functionality and/or other text-based functionality.

Further, the multimode input field may provide different types of functions, such as different types of searches, for a given modality of content. For instance, when text is displayed, the text may be used as a search string for a standard Internet search that returns relevant websites, relevant images, and/or other relevant Internet content. The multimode input field may also allow for searches that are tailored to the particular wearable computer and/or to a particular user associated with the wearable computer. For example, displayed text may be used as a search string for a user-specific search that is limited in scope to various data sources and/or various types of data associated with the user (provided that the user has given appropriate permission for a search of their data). The data associated with the user may include cloud-based data, information available via Internet sources (e.g., social networking accounts, e-mail accounts, etc.), data stored in the wearable computer, and/or data from other sources. Other types of text-based searches and/or other types of text-based functionality are also possible.

In a further aspect, an exemplary wearable computer may allow a user to initiate each of a number of possible actions via explicit instructions. For instance, a wearable computer may allow a user to initiate different types of searches on a given modality of input content. As an example, when text is displayed in the multimode input field, a wearable computer may allow for a number of different types of searches to be initiated via a touchpad. In one embodiment, a general Internet search may be initiated in response to a swipe gesture in a given direction or along a certain path, while a user-specific search may be initiated in response to a swipe gesture in another direction or along a different path. Other examples of touchpad instructions and/or instructions from other input sources may allow various types of functions to be initiated, without departing from the scope of the invention.

In another aspect, the functionality provided by the multimode input field may vary based on implicit information (e.g., data patterns) in data from the selected input source or other input sources. In particular, selection criteria 618 may not only specify what input source to select and/or what input content to display when a certain data pattern is detected, but what functionality should be provided in relationship to the displayed input content.

Furthermore, an exemplary system may provide a mechanism by which a user can correct, update, and/or cancel the content that is selected for display, in the event that the undesired content is being displayed. This mechanism may be provided via any user-input source (e.g., via a keyboard command or a speech instruction). Further, when a user corrects, updates, and/or cancels the selection of certain content, this information may be used to update the historical context data, so that selection of content for the multimode input field may be improved in the future.

A. Exemplary Functionality for Image Content

As noted, an exemplary wearable computer may provide various image-based functions when an image is displayed. For instance, an exemplary wearable computer may allow various types of image-based searches to be performed. Further, the multimode input field may be put into a viewfinder mode. Other functionality and modes of operation are also possible.

In the viewfinder mode, the multimode input field may be movable and/or resizable in response to certain adjustment instructions, in order to allow a user to identify a specific portion of an image for an action to be taken on. In an exemplary embodiment, multi-touch gestures on a touchpad 612, such as "pinch" or "reverse-pinch" gestures may be mapped to adjustment instructions for resizing the multimode input field. Further, a single-tap, a double-tap, a tap and hold gesture, or another type of gesture may then be used to select the multimode input field, before a swiping gesture is used to move the multimode input field to a new location in the display.

Figure 8D:
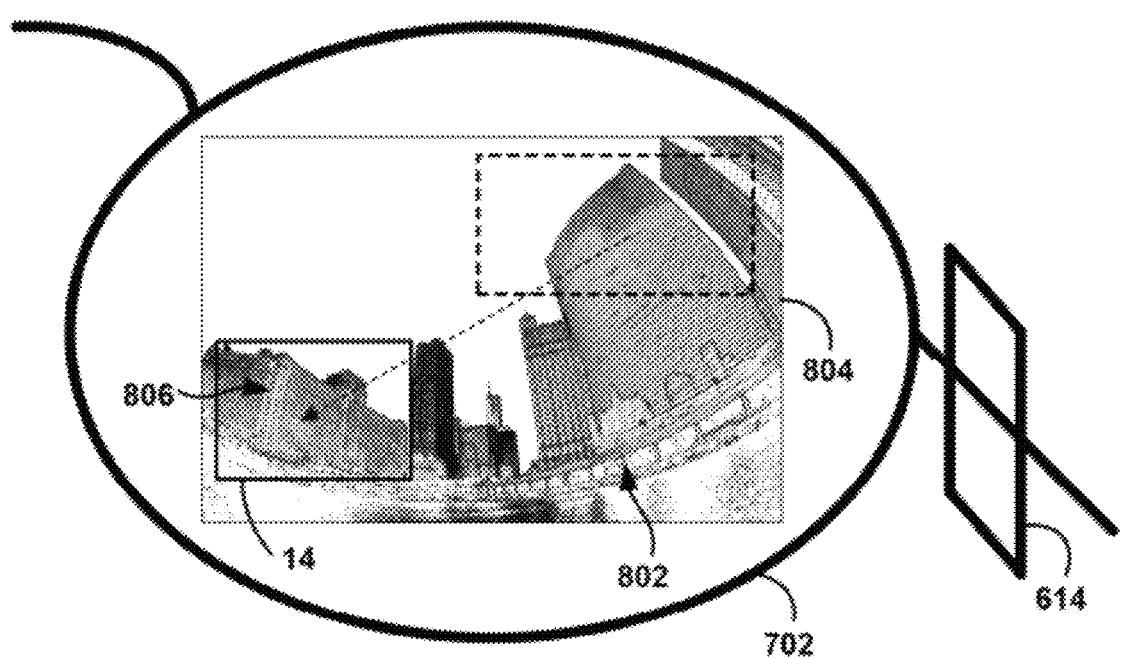

As a specific example, FIGS. 8C and 8D are additional illustrations of an HMD displaying a multimode input field that encloses a portion of a displayed image. In particular, FIGS. 8C and 8D show the same HMD 702 as shown in FIG. 8A. However, FIGS. 8C and 8D show the display 804 at later points in time, and also show the touchpad 614, which may be attached to or included as part of HMD 702.

In FIG. 8A, multimode input field 14 is of a first size. At this time, a certain gesture, such as a swipe in a predefined direction, may be used to place the multimode input field in viewfinder mode. A multi-touch gesture 802 may then be detected on touchpad 614, as shown in FIG. 8C. In the viewfinder mode, the wearable computer may interpret multi-touch gesture 802 as, for example, a resize action. In the illustrated example, multi-touch gesture 802 is a "reverse-pinch" gesture, which may be mapped to a resize action that increases the size of the virtual window. Accordingly, when multi-touch gesture 802 is detected, the wearable computer increases the size of the multimode input field 14 proportionally. Therefore, as shown in FIG. 8C, a larger portion of image 802 is enclosed by multimode input field 14. In a further aspect of the viewfinder mode, swiping gestures may be used to move the multimode input field around the display.

Provided with the above functionality, viewfinder mode may be used, for example, to identify a certain object in an image. For example, as shown in FIG. 8C, multimode input field 14 may initially be sized and located as shown in FIG. 8C, and enclose a portion of the image 802 in the upper right part of the display 804. However, as shown by FIG. 8D, multimode input field 14 may be moved and resized from the state shown in FIG. 8C, so that it substantially encloses a certain building 806.

Once a user has identified an object by enclosing it with the multimode input field 14, various actions may be taken in association with the object. For example, a wearable computer may initiate an image-based search in response to an instruction to do so. For example, the wearable computer may be configured to respond to a double-tap gesture within the multimode input field 14 by: (i) applying an object recognition technique to the enclosed portion of the image, in order to identify the enclosed object, and/or (ii) initiating an image-based search on the enclosed object.

In a further aspect, viewfinder mode may additionally or alternatively allow a user to identify the face of a person in an image. In such an embodiment, the wearable computer may be configured to respond to a double-tap gesture within the multimode input field, or another predefined instruction, by initiating a face-detection function on the enclosed portion of the video or image.

B. Exemplary Functionality for Video Content

Various functions may be provided in relation to video content displayed in the multimode input field. In one aspect, if a video is being displayed, the wearable computer may allow a snapshot of the video to be taken. In an exemplary embodiment, the wearable computer may allow a snapshot to be taken with an image capture instruction received from one of the various input sources. The snapshot may be of the entire video frame, or only of the portion of the video frame enclosed by the multimode input field.

In some embodiments, the snapshot from the video may then be displayed in the multimode input field. In such an embodiment, the wearable computer may then provide the same functions as when an image is displayed. For example, for various image-based searches based on the snapshot of the video, and display search results of the image-based search in the graphical display of the HMD. Further, the wearable computer may be configured to put the multimode input field in the viewfinder mode, and allow for object recognition, image-based search on an enclosed object, face detection on the enclosed portion of the snapshot, and/or face recognition on the enclosed portion of the snapshot, among others.

C. Application-Based Functionality

In an exemplary embodiment, a wearable computer may be further configured to run various applications in the multimode input field. For example, the multimode input field may serve as an application window for various types of applications such as word processing applications, web-browsing applications, and/or e-mail applications, among others.

In an exemplary embodiment, an application may be launched in the multimode input field automatically, when certain data patterns are detected and/or in certain contexts. An application may also be launched in the multimode input field in response to various explicit instructions. For example a speech command may launch an application, or a drag and drop gesture may be used to drag and drop an open application window in the multimode input field. Other examples are also possible.

When an application is open, a wearable computer may be configured to use incoming data from the selected input source as content for the application. For example, when a word-processing application is open in the multimode input field, the multimode input field may display a document. In such an embodiment, a wearable computer may be configured to use text received from a keyboard, or possibly text produced by speech-to-text conversion of speech in audio data, as input for the document.

Further, in some embodiments, a wearable computer may allow a user to enter text in the displayed document via a keyboard and via speech (e.g., by applying speech-to-text conversion of audio data from a microphone). Additionally, the wearable computer may allow a user to specify when input is being provided via speech instead of via the keyboard. For example, a wearable computer may by default listen for input data from the keyboard (i.e., textual data), and use text that is received from the keyboard as input content for the document. However, the wearable computer may respond to a predefined instruction, such as the user tapping and holding on the touchpad, by selecting a microphone as the input source. While the user is holding on the touchpad, the wearable computer may apply speech-to-text conversion to audio data from the microphone, and use the resulting speech as input content for the document.

Further, while the above functionality is described by way of example, with reference to a scenario where a word-processing application is open in the multimode input field, it may be applied in other scenarios as well. For example, when the wearable computer receives the predefined instruction, such as the user tapping and holding on the touchpad, the wearable computer may generally be configured to switch the selected input source from whatever input source is selected to the microphone, and/or to display text corresponding to speech in received audio data.

D. Flexible Use of Different Modalities of Input Content

An exemplary multimode input field, which is configured in the flexible and dynamic manner described herein, may help a user to easily convert information from one modality of input content to another and/or transfer information from various input sources to various applications.

For example, in a scenario where an email application is selected as the input source for the multimode input field, the multimode input field may display a new email message for editing. The wearable computer may then allow the user to use face recognition on an image in order to identify a recipient of the email. For example, the user may drag and drop an image of the person from another application such as an image browser, into a recipient field of the email message (e.g., a "to," "cc," or "bcc" field). Alternatively, the user may take an image (or a snapshot from a video) that includes the desired recipient. In either case, face recognition may then be performed on the image in order to identify the person. Further, a search may then be performed in order to determine the contact information for the identified person. If the contact information is located, and includes an email address, this email address may then be inserted into the recipient field of the email message.

E. Variation of Functionality Based on Context

In a further aspect, the functionality provided by the multimode input field may vary based on context. For example, when a wearable computer changes input sources and/or the type of input content based on context, the functionality of the multimode input field may change to the change in input content. Additionally or alternatively, functionality may vary according to context, even when the selected input source and/or the content of the multimode input field stay the same. In particular, an exemplary wearable computer may be configured to determine context (e.g., by determining one or more context signals), and then determine a type of action to perform on the content in the multimode input field, based on the determined context.

For example, a certain instruction may be mapped by default to a standard Internet search. However, when a wearable computer determines that the current context is "in a classroom," the instruction may be re-mapped so that the instruction initiates a search that is limited in scope to academic materials, instead of a standard Internet search.

As another example, a wearable computer may map a "Where can I get food?" command to different search functions that provide dining suggestions, depending on the context when the command is received. In some embodiments, the search function may vary in scope based on context signals or combinations of context signals such as a user's location, the current time, and/or items on user's calendar. For example, the search may be limited based on location to nearby locations. Further, the search may vary according to the time of day, in order to provide suggestions for the appropriate meal (e.g., breakfast suggestions during the morning hours) and/or to limit the search to restaurants that are currently open. Even further, the search may be limited based on the user's availability as indicate by, for example, the user's calendar. For instance, if the user only has thirty minutes for lunch before a scheduled meeting, the search may be limited to fast food restaurants and/or restaurants with take-out options.

As yet another example, a wearable computer may be configured to open a new email message in the multimode input field in response to an explicit instruction, such as a "compose email" speech command, for instance. However, the wearable computer may be configured to vary the email account that is used for the new email message based on context. For example, if the context is determined to be "at work," then the new email message may be sent from the user's work email account. On the other hand, if the context is determined to be "at home," or possibly any context other than "at work," then the new email message may instead be sent from the user's personal email account. Many other examples are also possible.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A non-transitory computer-readable medium having program instructions stored thereon that are executable by at least one processor, the program instructions comprising:
    instructions for causing a graphical display of a head-mountable display (HMD) to display a multimode input field, wherein the multimode input field is a single graphical interface element that is controllable to display content based on a plurality of modalities of input data received from any of a plurality of input sources, and wherein the plurality of modalities comprises point-of-view video and at least one of audio, image, text, and video;
    instructions for receiving input data from the plurality of input sources;
    instructions for monitoring the received input data for one or more data patterns indicated by input-selection criteria, wherein the one or more data patterns comprise: (a) at least one data pattern that corresponds to implicit information that is indicative of desired content for the multimode input field and (b) at least one data pattern corresponding to an explicit input-content instruction that indicates desired content for the multimode input field;
    instructions for selecting at least one input source from the plurality of input sources in response to detection of a data pattern in the received input data, wherein the detected data pattern matches a corresponding one of the data patterns indicated by the input-selection criteria; and
    instructions for displaying content in the multimode input field, wherein the displayed content is based on input data received from the at least one selected input source.

2. The non-transitory computer-readable medium of claim 1, wherein the program instructions further comprise:
    instructions for determining one or more context signals; and
    instructions for using the one or more context signals as a further basis to select the at least one input source.

3. The non-transitory computer-readable medium of claim 1, wherein the program instructions further comprise:
    instructions for receiving data comprising a drag-and-drop instruction to drag content from an application window to the multimode input field; and
    instructions for, in response to receipt of the drag-and-drop instruction, causing the graphic display to display the content indicated by the drag-and-drop instruction in the multimode input field.

4. The non-transitory computer-readable medium of claim 1, wherein the program instructions further comprise:
    instructions for receiving data comprising an input-content instruction, wherein the input-content instruction indicates particular content for the multimode input field, and wherein the input-content instruction comprises at least one of: (a) a drag-and-drop instruction to drag content from an application window to the multimode input field, (b) data corresponding to a gesture on a touchpad interface, and (c) input data comprising a spoken command captured in audio data; and
    instructions for, in response to receipt of the input-content instruction:
        (i) disabling the monitoring of the received input data for the one or more data patterns indicated by the input-selection; and
        (ii) causing the graphic display to display the content indicated by the input-content instruction in the multimode input field.

5. The non-transitory computer-readable medium of claim 1, wherein the program instructions further comprise:
    instructions for selecting a video input source as the input source for the multimode input field; and
    instructions for causing the graphic display to display video from the video input source in the graphical display of the HMD, wherein the video is displayed such that the multimode input field encloses a portion of the video.

6. The non-transitory computer-readable medium of claim 1, wherein the program instructions further comprise:
    instructions for selecting a video input source as the input source for the multimode input field;
    instructions for causing the graphic display to display at least a portion of the video from the video input source in the multimode input field;
    instructions for receiving a capture instruction and responsively capture a snapshot of the video displayed in the multimode input field;
    instructions for initiating an image-based search based on the snapshot of the video; and
    instructions for causing the graphic display to display one or more search results of the image-based search.

7. The non-transitory computer-readable medium of claim 1, wherein an image is displayed in the multimode input field, and wherein the program instructions further comprise:
    instructions for initiating an image-based search based on the displayed image; and
    instructions for causing the graphic display to display one or more search results of the image-based search.

8. The non-transitory computer-readable medium of claim 1, wherein text is displayed in the multimode input field, and wherein the program instructions further comprise:
    instructions for initiating a search based on the displayed text; and
    instructions for causing the graphic display to display one or more search results of the search.

9. The non-transitory computer-readable medium of claim 1, wherein the program instructions further comprise:
    instructions for launching an application in the multimode input field; and
    instructions for using the received input data from the at least one selected input source as content to the application.

10. The non-transitory computer-readable medium of claim 1, wherein the program instructions further comprise:
    instructions for determining one or more current context signals; and
    instructions for comparing the one or more current context signals to historical context data; and
    instructions for adjusting functionality of the multimode input field based on the comparison of the one or more current context signals to the historical context data.

11. The non-transitory computer-readable medium of claim 1, wherein the program instructions further comprise:
instructions for receiving a first data instruction to switch to an alternate operation mode in which the size of the multimode input field is adjustable via one or more size-adjustment gestures;
instructions for, while in the alternate operation mode:
receiving one or more size-adjustment gestures, wherein at least one of the size-adjustment gestures comprises a multi-touch gesture on a touchpad; and
resizing the multimode input field according to the received size-adjustment gestures; and
instructions for subsequent to receipt of the first data instruction, receiving a second data instruction indicating to select a portion of the video or image that is enclosed by the multimode input field at or near receipt of the second data instruction.

12. The non-transitory computer-readable medium of claim 11, wherein the program instructions further comprise instructions for initiating an image-based search on the selected portion of the video or image.

13. The non-transitory computer-readable medium of claim 11, wherein the program instructions further comprise instructions for initiating a face-detection function on the selected portion of the video or image.

14. A computer-implemented method comprising:
causing a graphical display of a head-mountable display (HMD) to display a multimode input field, wherein the multimode input field is a single graphical interface element that is controllable to display content based on a plurality of modalities of input data received from any of a plurality of input sources, and wherein the plurality of modalities comprises point-of-view video and at least one of audio, image, text, and video;
receiving input data from the plurality of input sources;
monitoring the received input data for one or more data patterns indicated by input-selection criteria, wherein the one or more data patterns comprise: (a) at least one data pattern that corresponds to implicit information that is indicative of desired content for the multimode input field and (b) at least one data pattern corresponding to an explicit input-content instruction that indicates desired content for the multimode input field;
selecting at least one input source from the plurality of input sources in response to detection of a data pattern in the received input data, wherein the detected data pattern matches a corresponding one of the data patterns indicated by the input-selection criteria; and
displaying content in the multimode input field, wherein the displayed content is based on input data received from the at least one selected input source.

15. The method of claim 14, further comprising:
determining one or more context signals; and
using the one or more context signals as a further basis to select the at least one input source.

16. The method of claim 14, wherein the input-selection criteria comprises an input selection rule indicating to select a video camera as the input source upon detection of the sequence of frames that is characteristic of fixation on a scene, and wherein the method further comprises:
detecting that a sequence of frames in point-of-view video that is captured by the video camera is characteristic of fixation on a scene by the user; and
in response to detection of the sequence of frames that is characteristic of fixation on a scene, selecting the video camera as the input source for the multimode input field.

17. The method of claim 14, further comprising:
determining that audio data received from a microphone comprises speech data;
responsively using the speech-to-text module to convert the speech data to corresponding text data; and
causing the graphic display to display the corresponding text data in the multimode input field.

18. The method of claim 14, further comprising:
selecting a video input source as the input source for the multimode input field;
causing the graphic display to display at least a portion of the video from the video input source in the multimode input field;
receiving a capture instruction and responsively capture a snapshot of the video displayed in the multimode input field;
initiating an image-based search based on the snapshot of the video; and
causing the graphic display to display one or more search results of the image-based search.

19. The method of claim 14, wherein an image is displayed in the multimode input field, and wherein the method further comprises:
initiating an image-based search based on the displayed image; and
causing the graphic display to display one or more search results of the image-based search.

20. The method of claim 14, wherein text is displayed in the multimode input field, and wherein the method further comprises:
initiating a search based on the displayed text; and
causing the graphic display to display one or more search results of the search.

* * * * *